US005455119A

United States Patent [19]
Taylor et al.

[11] Patent Number: 5,455,119
[45] Date of Patent: Oct. 3, 1995

[54] COATING COMPOSITION HAVING GOOD CORROSION AND OXIDATION RESISTANCE

[75] Inventors: Thomas A. Taylor, Indianapolis, Ind.; David F. Bettridge, Derby, England; Robert C. Tucker, Jr., Brownsburg, Ind.

[73] Assignees: Praxair S.T. Technology, Inc.; Rolls-Royce PLC, both of Danbury, Conn.

[21] Appl. No.: 148,460

[22] Filed: Nov. 8, 1993

[51] Int. Cl.⁶ .................. B32B 15/04; C22C 19/00; C22C 30/00
[52] U.S. Cl. .................. 428/632; 420/437; 420/443; 420/444; 420/588; 428/639; 428/640
[58] Field of Search .................. 428/632, 633, 428/639, 640, 678; 420/437, 438, 443, 444, 445, 588

[56] References Cited

U.S. PATENT DOCUMENTS

| | | | |
|---|---|---|---|
| Re. 33,876 | 4/1992 | Goward et al. | 428/633 |
| 3,676,085 | 7/1972 | Evans et al. | 29/194 |
| 3,754,903 | 8/1973 | Goward et al. | 75/171 |
| 3,918,139 | 11/1975 | Felten | 29/194 |
| 3,928,026 | 12/1975 | Hecht et al. | 75/134 |
| 3,993,454 | 11/1976 | Giggins, Jr. et al. | 29/194 |
| 4,101,713 | 7/1978 | Hirsch et al. | 428/554 |
| 4,124,737 | 11/1978 | Wolfla et al. | 420/588 |
| 4,313,760 | 2/1982 | Dardi et al. | 428/632 |
| 4,451,431 | 5/1984 | Naik | 420/444 |
| 4,451,496 | 5/1984 | Gedwill et al. | 427/34 |
| 4,585,481 | 4/1986 | Gupta et al. | 106/14.05 |
| 4,615,864 | 10/1986 | Dardi et al. | 420/437 |
| 4,677,034 | 6/1987 | Luthra | 428/678 |
| 4,719,080 | 1/1988 | Duhl et al. | 420/444 |
| 4,743,514 | 5/1988 | Strangman et al. | 428/678 |
| 4,943,487 | 7/1990 | Benn et al. | 418/552 |
| 4,995,922 | 2/1991 | Jongenburger | 420/443 |
| 5,154,885 | 10/1992 | Czech et al. | 420/437 |

FOREIGN PATENT DOCUMENTS 2095700 10/1982 United Kingdom .

*Primary Examiner*—George Wyszomierski
*Attorney, Agent, or Firm*—Cornelius F. O'Brien

[57] ABSTRACT

A coating composition comprising an alloy having the formula RCrAlR'R" wherein R is nickel, cobalt or the like; R' is yttrium or hafnium and R" is tantalum, rhenium and/or platinum, preferably mixed with an oxide dispersion such as alumina, to provide an improved class of coatings suitable for operating in high temperature oxidizing environments.

11 Claims, 8 Drawing Sheets

COATING COMPOSITION HAVING GOOD CORROSION AND OXIDATION RESISTANCE

FIELD OF THE INVENTION

The invention relates to an improved class of coatings suitable for operating in high temperature oxidizing environments in which said coatings comprise an alloy, such as NiCrAlYTa, or NiCrAlYPt preferably mixed with an oxide dispersion such as alumina or any combination thereof.

BACKGROUND OF THE INVENTION

There are many good oxidation and corrosion resistant coatings used in industry for various applications and for use in various environments. Articles composed of iron-, cobalt-, or nickel-based superalloys have been developed for use in applications, such as aerospace applications, and for use as blades, vanes, seals and other components utilized in gas turbine engines. In these applications, it is important that the articles have sufficient protection against undue oxidation and sulfidation since such corrosion can affect the useful life of the article resulting in reduced performance and possible safety problems. Although various superalloys have a high degree of corrosion resistance, such resistance decreases when the superalloys are operated in or exposed to high temperature environments.

To increase the useful life of components made of alloys and superalloys, various coatings have been developed. Aluminide coatings were initially used to provide a corrosion resistant outer layer but such layer was observed to crack when subjected to mechanically or thermally induced strain. Another class of coatings developed was the MCrAlY overlay coatings where M represents a transition metal element such as iron, cobalt or nickel. The coatings have been found to be more effective than the aluminide coatings in extending the useful life of alloy components in high temperature environments.

Modern gas turbine engines operate in a high temperature environment in excess of 2000° F. in which hot gases are expanded across rows of turbine blades. These turbine blades are typically nickel base alloys chosen for excellent high temperature creep and thermal fatigue resistance. In general, the design of the blade alloy sacrifices resistance to oxidation and hot corrosion in order to achieve the optimized mechanical properties. Therefore, the blade is coated with a thin layer of material designed to provide only high resistance to oxidation or hot corrosion, with little regard to mechanical properties of the coating. This thin coating, typically 3 to 8 mils thick, is generally applied by argon shrouded plasma spraying, plasma spraying in a vacuum chamber, or by physical vapor deposition methods.

In the field of gas turbine engines, designers continually look toward raising the operating temperature of the engine to increase efficiency. In turn, higher temperatures act to reduce the life of the current coatings on the turbine blades and vanes. Components of a gas turbine engine can also be subjected to hot corrosion. This can occur when there is salt ingested into the engine via the intake air, or when the fuel has even low levels of sulfur concentration, or both. The attack of bare blades or even coatings on blades can be very rapid in hot corrosion, where the sulfur and salt can form liquid compounds on the surface that are able to dissolve the otherwise protective oxide scale on the substrate. This hot corrosion mechanism is most aggressive when the blade temperature falls between the temperatures where the complex salt-sulfate compounds melt and the temperature where the compounds evaporate. In the intermediate temperature range a liquid film of the corrodant can exist on the surface of the substrate and be very deleterious. Even in engines that generally run at high temperatures, above the evaporation temperature of such liquid corrodants, there may be conditions where the components pass through the lower temperature regime, such as during reduced power operation or at idle waiting for take-off in an aero engine. If the corrodants are present in the air or fuel, they can enhance the rate of attack during these periods.

In operation, the turbine blade experiences a range of temperatures as the power demand is raised or lowered. The blade also experiences a range of axial stresses as the rotation speed of the blade is increased or decreased. Of course, both the temperature change and the stress change happen concurrently to the rotating blade. One mode is when temperature and tensile stress both increase together as the demand for power is increased, and they both decrease together as power is reduced. If the blade temperature were plotted on the abcissa and the stress on the ordinate of an x-y graph, the above mode would look like a single upward sloping line in the positive stress and temperature quadrant. It is possible when temperature changes quickly or the surface of the blade is heated or cooled faster than the core of the blade, that the graph of the total power cycle is not the same simple curve for heating and cooling. Rather the heating and cooling legs of the stress-temperature graph may be different, and the total cycle looks like an open loop. This is an indication of hysteresis in the system between stress and temperature.

If now a thin coating is applied to the blade surface, and the coating has a different thermal expansion rate than the blade alloy, the situation becomes more complicated. One can envision separate stress-temperature graphs for the coating and the blade alloy for the same power cycle. In many cases, the thermal expansion rate of MCrAlY coatings is greater than that of typical nickel base blade alloys. Considering the stress-temperature graph of the coating, there would be two contributions to its stress state. One would be the radial tensile stress due to increasing the rotational speed of the blade. The stress in the coating would be the same as in the underlying blade due to this effect. In addition, since the coating is assumed to expand faster than the blade alloy, it wants to become longer than the blade but is well bonded to the substrate so it is constrained and a compressive stress develops in the coating. The total coating stress is the sum of the two contributions. The heating leg of the coating graph will thus have less tensile stress than the blade because of the compression component, so its curve would increasingly fall below the simple line assumed for the bare blade. If all the high temperature stress was able to be stored in the coating, when it experienced the cooling leg of the cycle it would trace back along the heating leg for the coating. However, most MCrAlY coatings are weak at high temperatures in comparison to blade alloys, and some of the stress in the coating would be reduced due to annealing or creep. In that case, when the cooling leg of the cycle occurs, the coating stress will end up at a lower value at the final low temperature than what it was at the start. This is due to the stress relaxation effect of the weak coating at the high temperature. Depending on the relative contributions of the stress due to blade spinning compared to the differential thermal expansion stress effects, and the number of cycles of heating and cooling, the coating could become increasingly more in compression. A mechanism such as described here could be responsible for the observation that some coatings become buckled and cracked after many cycles.

A further current problem with conventional MCrAlY coatings on superalloy substrates is interdiffusion of coating elements into the substrate and substrate elements into the coating after long times of high temperature exposure. The loss of coating aluminum to the substrate is noticed by an aluminide depletion layer in the coating. Certain substrate elements like titanium have been found to diffuse through the MCrAlY coating to the external surface oxide scale and to make said oxide scale less protective. It would be desirable to modify current MCrAlY coatings to reduce this interdiffusion effect.

Although MCrAlY has overall been a successful class of coatings having good oxidation and corrosion resistance for superalloys, improvements have been made to the MCrAlY coatings.

U.S. Pat. No. 3,676,085 discloses that the oxidation-erosion and sulfidation resistance of the nickel- and cobalt-based superalloys is markedly improved through the use of a coating consisting of cobalt, chromium, aluminum and an active metal such as yttrium, particularly at the composition, by weight, of 15–40 percent chromium, 10–25 percent aluminum, 0.01–5 percent yttrium, balance cobalt.

U.S. Pat. No. 3,754,903 discloses a coating alloy for the gas turbine engine super-alloys which consists primarily of nickel, aluminum and a reactive metal such as yttrium, particularly at the composition, by weight, 14–30 percent aluminum, 0.01–0.5 percent reactive metal balance nickel. A preferred embodiment also includes 15–45 weight percent chromium.

U.S. Pat. No. 3,928,026 discloses a highly ductile coating for the nickel- and cobalt-base superalloys having long term elevated temperature oxidation-erosion and sulfidation resistance and diffusional stability which coating consists essentially of, by weight, 11–48% Co, 10–40% Cr, 9–15% Al, 0.1–1.0% reactive metal selected from the group consisting of yttrium, scandium, thorium, lanthanum and the other rare elements, balance essentially Ni, the nickel content being at least about 15%.

U.S. Pat. No. 3,993,454 discloses coatings which are particularly suited for the protection of nickel and cobalt superalloy articles at elevated temperatures. The protective nature of the coatings is due to the formation of an alumina layer on the surface of the coating which serves to reduce oxidation/corrosion. The coatings contain aluminum, chromium, and one metal chosen from the group consisting of nickel and cobalt or mixtures thereof. The coatings further contain a small controlled percentage of hafnium which serves to greatly improve the adherence and durability of the protective alumina film on the surface of the coating. U.S. Pat. No. 4,585,481 discloses a similar coating except that yttrium and hafnium are used together along with silicon.

U.S. Pat. No. 3,918,139 discloses a nickel, cobalt and nickel-cobalt alloy coating composition having improved hot corrosion resistance. In particular, an improved MCrAlY type alloy coating composition consists essentially of, by weight, approximately 8–30 percent chromium, 5–15 percent aluminum, up to 1 percent reactive metal selected from the group consisting of yttrium, scandium, thorium and the other rare earth elements and 3–12 percent of a noble metal selected from the group consisting of platinum or rhodium, the balance being selected from the group consisting of nickel, cobalt and nickelcobalt.

U.S. Pat. No. 4,677,034 discloses an MCrAlY coating in which silicon is added. U.S. Pat. No. 4,943,487 disclosed a NiCrAlY or NiCoCrAlY coating to which tantalum is added. U.S. Pat. No. 4,743,514 discloses a coating for protecting the surfaces of gas turbine components such as single crystal turbine blades and vanes, wherein the coating has a composition (in weight percent) consisting essentially of chromium, 15–35; aluminum, 8–20; tantalum, 0–10; tantalum plus niobium, 0–10; silicon, 0.1–1.5; hafnium, 0.1–1.5; yttrium, 0–1; cobalt, 0–10; and nickel, balance totalling 100 percent. A preferred coating, which is particularly desirable for use with single-crystal turbine blades and vanes, has a composition consisting essentially of chromium, 17–23; aluminum, 10–13; tantalum plus niobium, 3–8; silicon, 0.1–1.5; hafnium, 0.1–1.5; yttrium, 0–0.8; cobalt, 0-trace; and nickel, balance totalling 100 percent. A process for preparing the coated component is also described.

U.S. Pat. No. 4,615,864 disclosed coatings for iron-, nickel- and cobalt-base superalloys. The coatings are applied in order to provide good oxidation and/or sulfidation and thermal fatigue resistance for the substrates to which the coatings are applied. The coatings consist essentially of, by weight, 10 to 50% chromium, 3 to 15% aluminum, 0.1 to 10% manganese, up to 8% tantalum, up to 5% tungsten, up to 5% reactive metal from the group consisting of lanthanum, yttrium and other rare earth elements, up to 5 percent of rare earth and/or refractory metal oxide particles, up to 12% silicon, up to 10% hafnium, and the balance selected from the group consisting of nickel, cobalt and iron, and combinations thereof. Additions of titanium up to 5% and noble metals such as platinum up to 15% are also contemplated.

U.S. Pat. No. 4,101,713 discloses a coating made from mechanically alloyed MCrAl with a dispersoid of $Al_2O_3$, $ThO_2$ or $Y_2O_3$.

It is an object of the present invention to provide an improved coating having good high temperature oxidation resistance characteristics.

It is another object of the present invention to provide a coating for substrates that are intended to operate in high temperature oxidizing and sulfidizing environments.

It is another object of this invention to provide a coating for superalloy substrates that will have a thermal expansion rate that is similar to that of the substrates and will have a greater high temperature strength so that it will resist stress relaxation.

It is another object of the present invention to improve the diffusional stability of the coating toward nickel and cobalt base substrates.

SUMMARY OF THE INVENTION

The invention relates to a coating composition comprising an alloy of RCrAlR'R" wherein R is at least one element selected from the group consisting of iron, cobalt and nickel, R' is at least one element selected from the group consisting of yttrium and hafnium and R" is at least one element selected from the group consisting of tantalum, platinum or rhenium and said alloy mixed with an oxide dispersion such as alumina, thoria, yttria and the rare earth oxides, hafnia and zirconia.

The amount of R, R' and R" in the coating alloy will depend on the specific composition of the coating and the environment that the coating will be used in. For most applications, the following amounts of the components would be suitable.

TABLE 1

| Composition | Elements-weight percent of Composition* | | | | | | |
|---|---|---|---|---|---|---|---|
| | Co | Ni | Cr | Al | Y** | Ta | Pt |
| NiCrAlYPt | — | Bal. | 15–25 | 7–14 | 0.1–1 | — | 3–6 |
| NiCoCrAlYPt | 10–40 | Bal. | 15–25 | 7–14 | 0.1–1 | — | 3–6 |
| CoCrAlYPt | Bal | — | 10–50 | 4–12 | 0.1–1 | — | 3–6 |
| NiCrAlYTa | — | 53–75 | 15–25 | 7–14 | 0.1–1 | 3–8 | — |
| NiCoCrAlYTa | 10–40 | Bal | 15–25 | 7–14 | 0.1–1 | 3–8 | — |
| CoCrAlYTa | 30–83 | — | 10–50 | 4–12 | 0.1–1 | 3–8 | — |
| NiCrAlYTaPt | — | 47–72 | 15–25 | 7–14 | 0.1–1 | 3–8 | 3–6 |
| NiCoCrAlYPtTa | 10–40 | Bal | 15–25 | 7–14 | 0.1–1 | 3–8 | 3–6 |
| CoCrAlYPtTa | 24–80 | — | 10–50 | 4–12 | 0.1–1 | 3–8 | 3–6 |

Bal = balance of weight
**When hafnium is used in place of yttrium or along with yttrium, it can be added in an amount between about 0.1 and 2.0 weight percent.

Generally, the coating composition of this invention would have R between 19 and 83 weight percent of the alloy; Cr between 10 and 50 weight percent of the alloy; Al between 4 and 14 weight percent of the alloy; R' between 0.1 and 3 weight percent of the alloy; and R" between 3 and 14 weight percent of the alloy.

The oxide dispersion in the coating mixture can be added in an amount from 5 to 20 volume percent based on the volume of the coating mixture, preferably between 8 and 12 volume percent. The preferred oxide dispersion would be alumina. To prepare the coating mixture, the alloy should be prepared with the elements in an amount to provide an alloy composition as shown, for example, in Table 1. Preferably, the alloy could be made by the vacuum melt process in which the powder particles are formed by inert gas atomization. The oxide component could then be added to the alloy in an appropriate amount and blended to produce a composite powder by ball-milling, attritor milling or any other technique. The preferred powder size would be about 5 to 100 microns, and more preferably between 10 to 44 microns. The composite powder produced can then be deposited on a substrate using any thermal spray device. Preferred thermal spray methods for depositing the coating are inert gas shrouded plasma spraying, low pressure or vacuum plasma spraying in chambers, high velocity oxygen-fuel torch spraying, detonation gun coating or the like. The most preferred method is inert gas shrouded plasma spraying. It could also be advantageous to heat treat the coating using appropriate times and temperatures to achieve a good bond for the coating to the substrate and a high sintered density of the coating, and then to peen the coating. Some suitable substrates are nickel base superalloys, nickel base superalloys containing titanium, cobalt base superalloys, and cobalt base superalloys containing titanium. Preferably, the nickel base superalloys would contain more than 50% by weight nickel and the cobalt base superalloys would contain more than 50% by weight cobalt. A sample of specific substrates are shown in Table 2.

TABLE 2

| Alloy | (All elements in weight percent*) | | | | | | | | | | | | | | |
|---|---|---|---|---|---|---|---|---|---|---|---|---|---|---|---|
| | Ni | Co | Cr | W | Mo | Ta | Ti | Al | Hf | Zr | C | B | Cb | Re | V |
| Ma, M-002 | Bal | 10 | 9 | 10 | — | 2.5 | 1.5 | 5.5 | 1.5 | .05 | .15 | .015 | — | — | — |
| Rene 80 | Bal | 9.5 | 14 | 4 | 4 | — | 5 | 3 | — | .06 | .17 | .015 | — | — | — |
| Mar-M-200 + Hf | Bal | 10 | 9 | 12.5 | — | — | 2 | 5 | 2 | — | .14 | .015 | 1 | — | — |
| CMSX-4 | Bal | 9.5 | 6.5 | 6.4 | 0.6 | 6.5 | 1 | 5.6 | 0.1 | — | .006 | — | — | 3 | — |
| IN-100 | Bal | 15 | 9.5 | — | 3 | — | 4.75 | 5.6 | — | .06 | .17 | .015 | — | — | 1 |
| B-1900 | Bal | 10 | 8 | — | 6 | 4.25 | 1 | 6 | 1.1 5 | .08 | .11 | .015 | — | — | — |
| Mar M-509 | 10 | Bal | 22.5 | 7 | — | 3.5 | 0.2 | — | — | 0.5 | 0.6 | .01 Max | — | — | — |

*Balances of compositions were minor traces of other elements
Mar M is a trademark of Martin Metals Co.
René is a trademark of General Electric Co.
CMSX is a trademark of Cannon-Muskagon Co.
IN is a trademark of International Nickel Co.

EXAMPLE 1

Several different alloys were made in which single element additions of tantalum or platinum were added to a melt containing Ni and/or Co plus CrAlY prior to argon atomization to powder. The addition of the tantalum or platinum was at the expense of cobalt in the composition of the alloy. Additional coatings were made in which an oxide dispersion was added. The alloy powder was mixed with 0.3 micron diameter alumina and attriton milled to produce a powder mixture passed through a −325 tyler mesh (44 microns). The various powder compositions were plasma sprayed to various thicknesses on various substrates using an argon shrouded plasma torch operating at 150 amperes. The various powder compositions are shown in Table 3.

TABLE 3

| Composition | Weight percent of element in alloy | | | | | | | Volume percent of oxide in mixture |
|---|---|---|---|---|---|---|---|---|
| Sample | Co | Ni | Cr | Al | Y | Ta | Pt | $Al_2O_3$ |
| Sample A CoNiCrAlY | 38 | 32 | 21 | 8 | 0.5 | | | |
| Sample B CoNiCrAlYTa | 35 | 32 | 21 | 8 | 0.5 | 3 | | |
| Sample C CoNiCrAlYTa | 30 | 32 | 21 | 8 | 0.5 | 8 | | |
| Sample D CoNiCrAlYPt | 35 | 32 | 21 | 8 | 0.5 | | 3 | |
| Sample E CoNiCrAlYPt | 32 | 32 | 21 | 8 | 0.5 | | 6 | |
| Sample F CoCrAlY | 74 | | 18 | 8 | 0.7 | | | |
| Sample G CoCrAlY | 74 | | 18 | 8 | 0.7 | | | 10 |
| Sample H CoCrAlY | 74 | | 18 | 8 | 0.7 | | | 20 |
| Sample I NiCoCrAlY | 15 | 53 | 20 | 11 | 0.5 | | | |
| Sample J NiCoCrAlY | 15 | 53 | 20 | 11 | 0.5 | | | 10 |
| Sample K NiCoCrAlY | 15 | 53 | 20 | 11 | 0.5 | | | 20 |

*Balances of compositions were minor traces of other elements

The various coating compositions were coated on a substrate of Mar M-002 to a thickness of about 6 mils. The coatings were tested in a burner rig with the following characteristics:

| Mass air flow | 60 lbs./min |
|---|---|
| Gas velocity | 650 ft/sec. |
| Fuel | Standard aviation kerosene |
| Sulfur content | 0.2% in fuel |
| Synthetic salt | 0.5 ppm into pre-combustor line |
| Specimen Temp. | 1050 C. |
| Hot time | 13 minutes per cycle with 1 minute cool-down then 1 minute heating for the next cycle |

Figure 1:
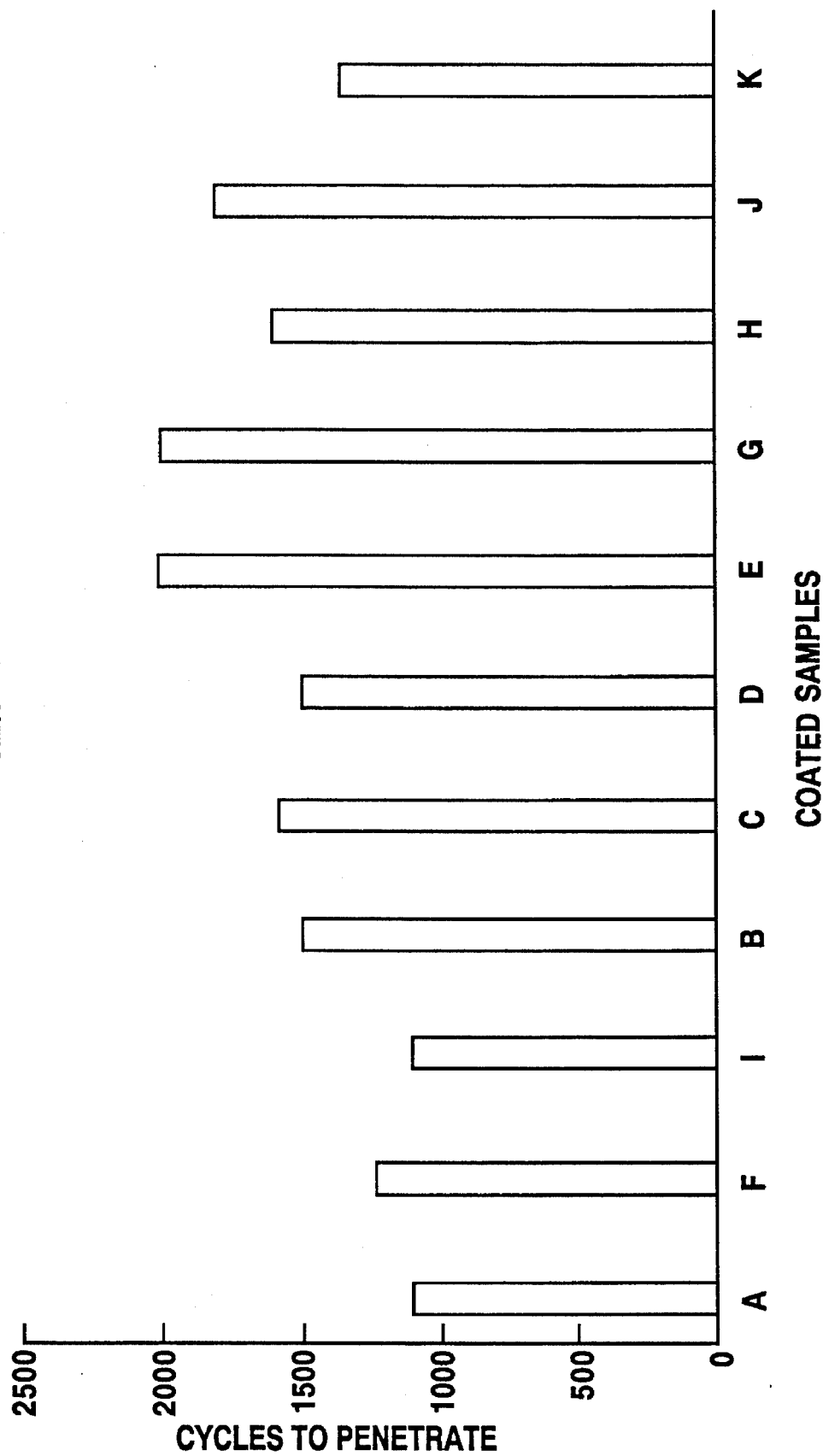
FIG. 1. Graph of burner rig cycles to penetrate single additions of MCrAlY coatings.

The data obtained are shown in FIG. 1. As can be seen for Table 1, Samples B, C D and E increased the life of the coating by 40 percent or more over Sample A. Also Samples G and H increased the life of the coating over 40 percent or more over Sample F, and Samples J and K increased the life of the coating over Sample I. In each case, an additive of platinum, tantalum or oxide to the base Samples A, F and I made significant improvements to the burner rig life test of the coating.

Figure 2:
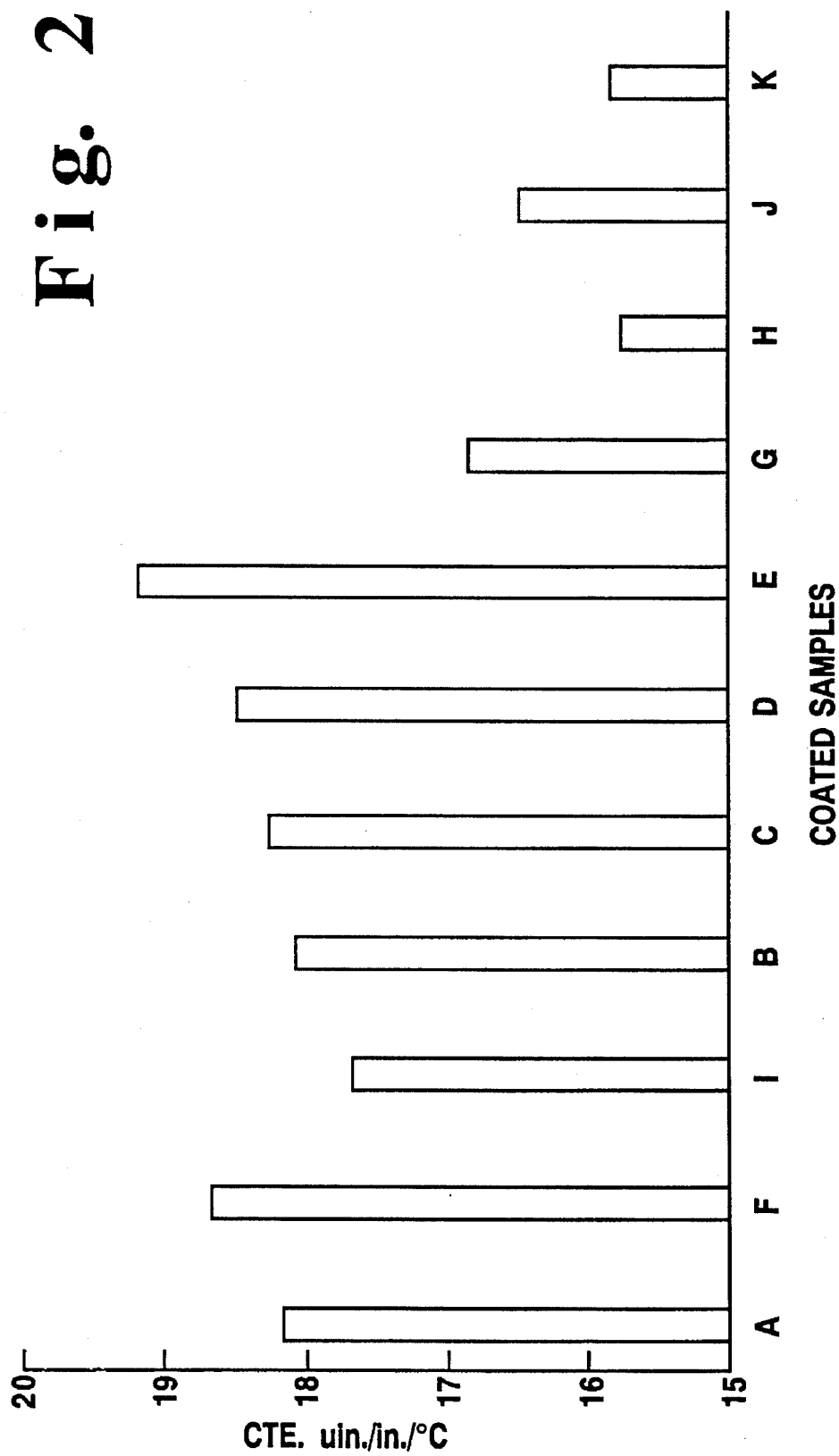
FIG. 2. Coefficient of thermal expansion for various as-coated samples.
Figure 3:
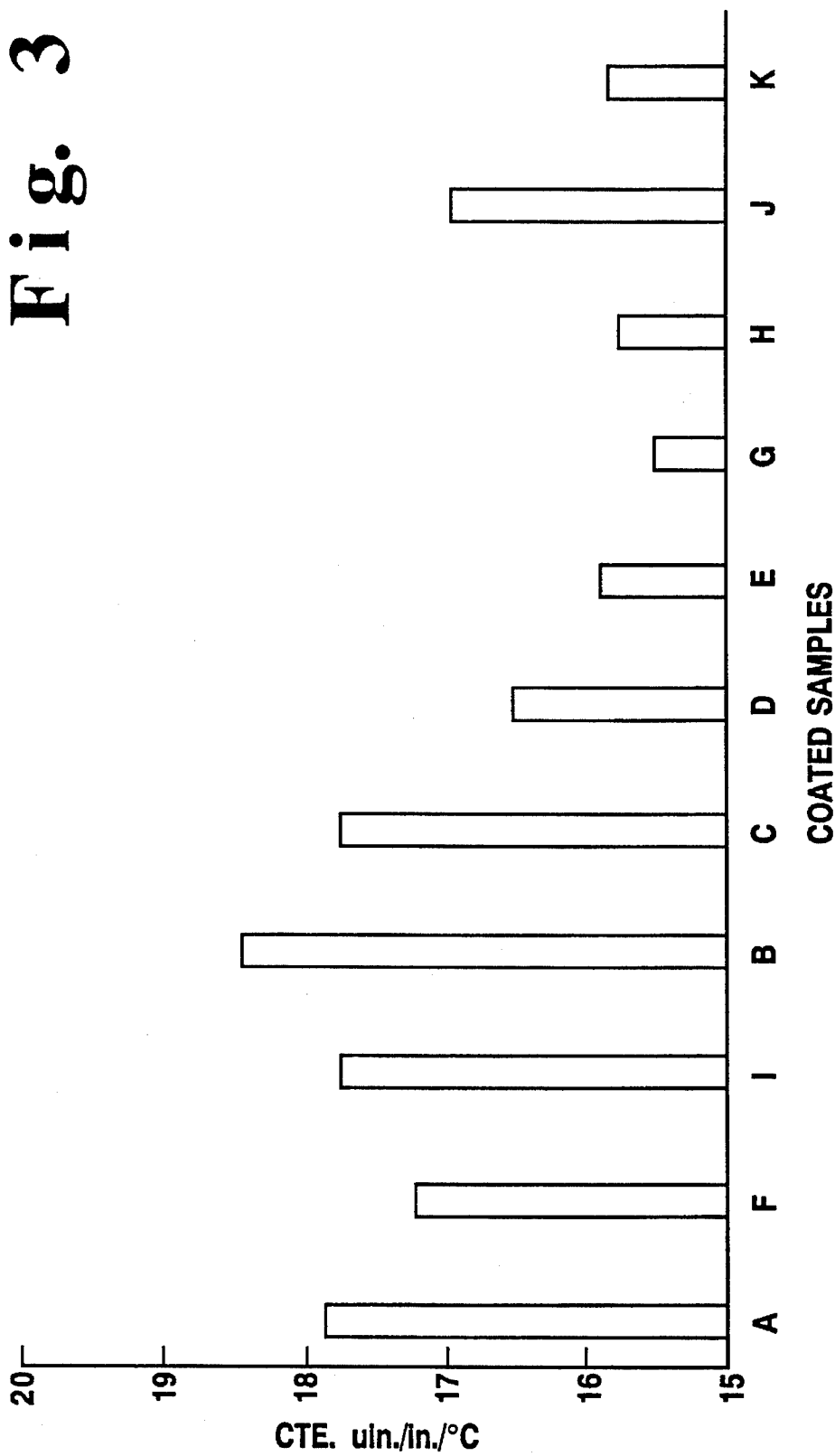
FIG. 3. Coefficient of thermal expansion for various heat treated coating samples.

The thermal expansion of the samples of Table 3 were measured in a vertical dilatometer constructed of a tripod support legs and a central pushrod, all made from the same single crystal of sapphire. The heating rate was held constant at 5° C./min., while a computer recorded specimen temperature and length signal from a linear variable differential transformer (LVDT) attached to the pushrod. The mean coefficients between 25° and 1050° C. are shown in FIG. 2. The Samples were tested in the as-coated condition and as a second set having been first vacuum heat treated 4 hours at 1080° C. In comparison, typical nickel base superalloys for turbine blades have CTE's to 1050° C. of 16.6, 17.0, and 16.1 uin./in./C. for Mar-M-002, Rene' 80, and Mar-M-200+ Hf, respectively. The as-coated FIG. 2 and heat treated FIG. 3 results are only slightly different for most of the coatings, possibly due to relaxation of residual stress. The Samples A, F and I coatings have CTE's of about 18 uin./in./C. and one of the object was to reduce this to be closer to the blade alloys. Adding tantalum does not change the CTE. However, the platinum addition makes a substantial reduction in coating CTE after heat treatment. This would be the normal state of the coating on the turbine blade. It may be that the heat treatment allows the formation of a platinum aluminide or some other phase that has low CTE, that reduces the overall CTE of the coating. This finding was an unexpected benefit of the platinum addition since up to now its main attribute has been to improve hot corrosion resistance. Finally the oxide additions were found to be very effective in reducing CTE. The results show that 10 vol. percent alumina reduces the CTE from about 18 to 17 uin./in./C., and 20 vol. percent reduces the CTE to about 15.7 uin./in./C.

Figure 4:
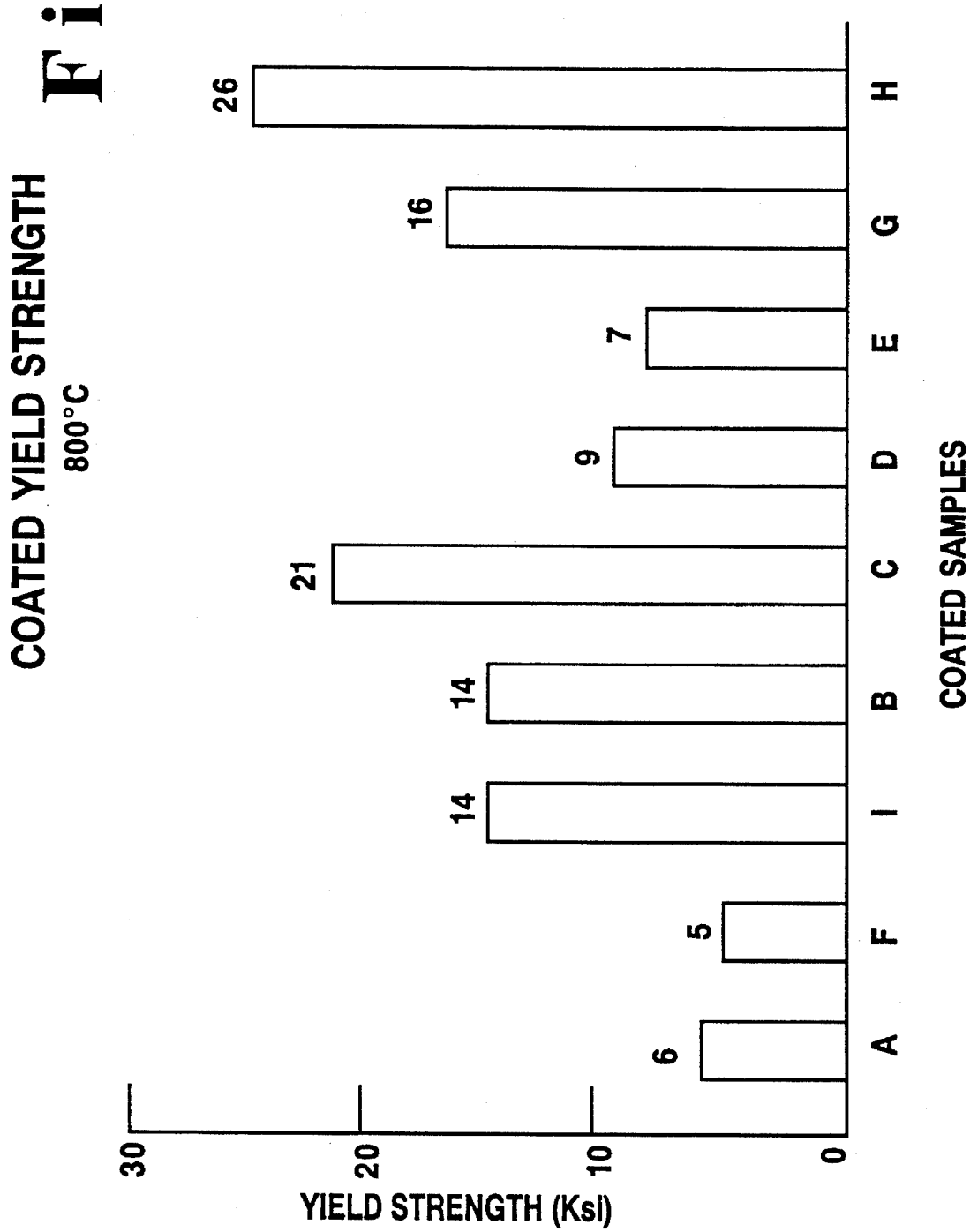
FIG. 4. Tensile yield strength for various coating samples at 800° C.
Figure 5:
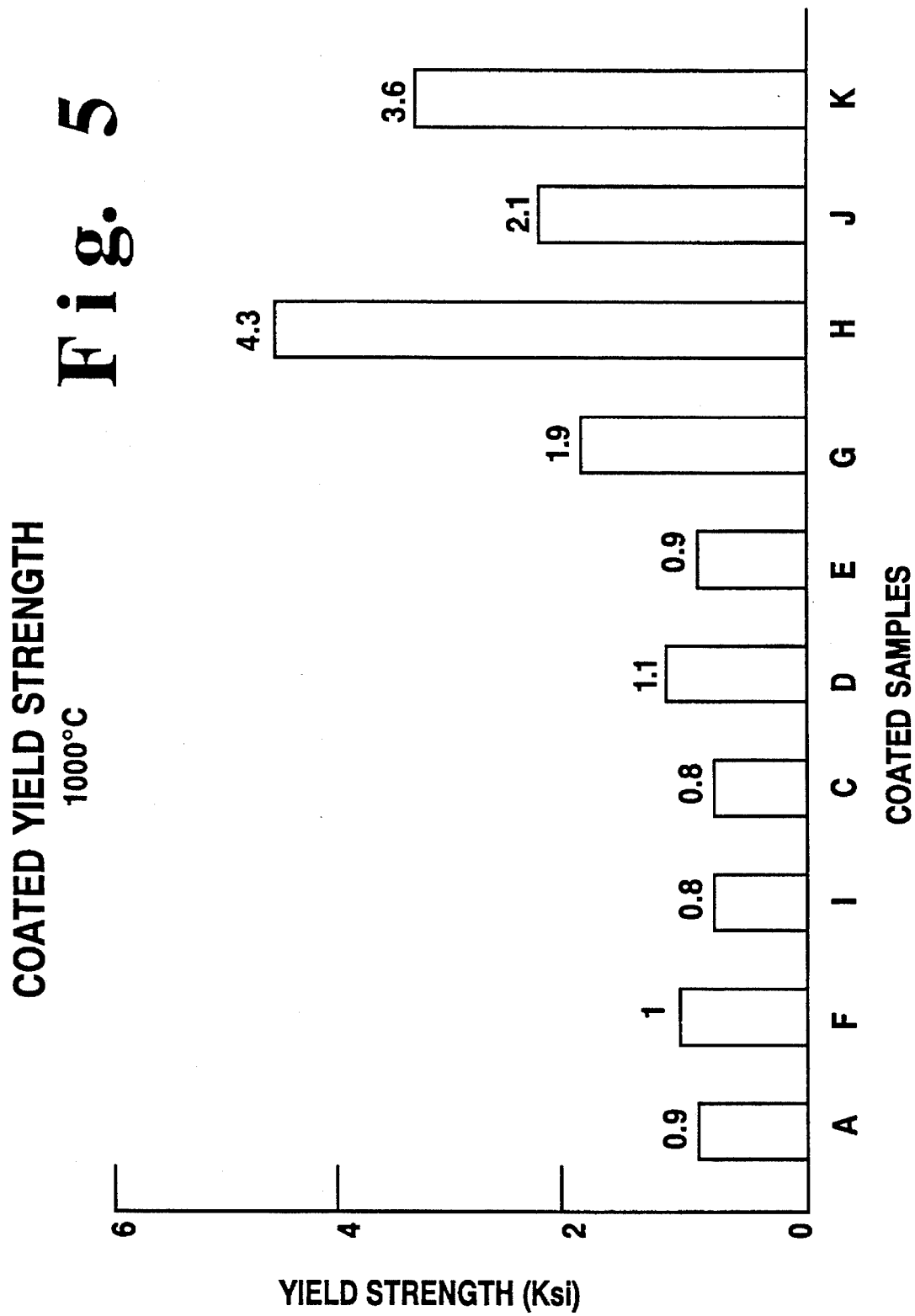
FIG. 5. Tensile yield strength for various coating samples at 1000° C.

Thick coatings of each of the candidate materials were heat treated, 4 hours at 1080° C., ground flat and machined to a tensile test profile, with reduced strip width in the gage section. The tensile tests were done at 800° and 1000° C., using a strain rate of 0.005 to 0.006 in./in./min. up to the 0.2% offset yield stress. These data are shown in FIG. 4. Coating Samples A and F were also included. We found that by adding tantalum to the CoNiCrAlY (Sample B) the yield strength at 800° C. more than doubled for a 3 wt. percent addition, and more than tripled for an 8% Ta addition (Sample C). The platinum additions to Sample D increased the yield strength by a more modest 40 percent. When we added an aluminum oxide dispersion to CoCrAlY, the yield strength tripled for a 10 vol. percent addition (Sample G), and increased by a factor of 5 for a 20 vol. percent addition (Sample H). As evident from FIG. 5, at 1000° C., we found that the tantalum or platinum additions were no longer contributing to higher yield strength, but that the oxide continued its strengthening role. For both the CoNiCrAlY (Sample A) and the CoCrAlY (Sample F) base alloys, the increased yield strength was about twice for a 10 vol. percent addition and about 4 times for a 20 vol. percent addition.

EXAMPLE 2

Sample coating powders were produced as above except that the compositions were different. The compositions of the various powders are as shown in Table 4. The object here was to explore multiple additions and combinations of the Example 1 single component additions to look for even greater synergestic improvements in coating properties.

TABLE 4

| Composition Sample | Elements by Weight of Composition | | | | | | | Oxide additive Volume percent of mixture |
|---|---|---|---|---|---|---|---|---|
| | Co | Ni | Cr | Al | Y | Ta | Pt | $Al_2O_3$ |
| I | 40.5 | 30.7 | 21.3 | 7.8 | 0.3 | | | |
| II | 32.1 | 31.0 | 21.0 | 7.7 | 0.6 | 2.8 | 4.8 | |
| III | 38.7 | 32.4 | 21.2 | 6.8 | 0.6 | | | 11.2 |
| IV | 38.2 | 31.1 | 21.7 | 6.3 | 0.6 | 3.2 | | 11.4 |
| V | 35.6 | 32.1 | 21.2 | 6.6 | 0.4 | | 4.9 | 11.3 |
| VI | 33.0 | 31.1 | 21.5 | 7.2 | 0.6 | 2.8 | 5.0 | 10.6 |
| VII | 74.7 | | 18.6 | 5.9 | 0.5 | | | 11.5 |
| VIII | 64.7 | | 20.2 | 6.4 | 0.4 | 3.1 | 4.9 | 11.1 |

The coating powders shown in Table 4 were coated on smooth substrates, such that samples could be easily removed for free-standing density measurement. The coating samples were heat treated in vacuum for 4 hours at 1080° C., then tested for density by the water immersion method (ASTM B-328). The theoretical density is the density of the material in a porosity-free condition. This can be calculated from the composition by the Hull method (F. C. Hull, "Estimating Alloy Densities", Metal Progress, November 1969, p. 139) and with correction for oxide addition for certain coatings of Table 4. The density results are shown in Table 5. The fully metallic coatings (I and II) were found to reach a high percentage of their theoretical density, about 95 to 96 percent. The oxide dispersed coatings were found to only reach lower densities after heat treatment, 88 to 90 percent of theoretical.

The coatings of Table 4 were deposited on Mar M-002 pin substrates at nominally 6 mils thickness, heat treated 4 hours at 1080° C., finished smooth and peened at 12N Almen intensity. They were given a cyclic oxidation test exposure at 1050° C. in air, with a 50 minute period in the furnace and a 10 minute cooling period. Separate samples were tested to 100 hours total, and to 300 hours total. The tested pins were gold and nickel plated, then mounted in cross section to measure the width of the aluminide depletion layer beneath the external surface. We consider the thickness of this depletion to be a measure of the consumption of coating life, and thus smaller depletion layers for the same time and temperature exposure is a sign of longer coating life. The data observed is shown in Table 5 and demonstrates that after 100 hours, several coatings have less depletion than Sample I, and these all contain Ta as one of the additives. We also found that when the additive was the oxide alone, the depletion thickness increased over Sample I, an effect which may be due to the lower density. However, when Ta+Pt is additionally added to the oxide bearing coating the depletion is significantly reduced. These particular data indicate that Ta is the most effective addition for reduced aluminide depletion in oxidation, and that it or in combination with Pt, allow the oxidation resistance of oxide addition coatings to be restored. This combination will allow oxide additions to be made for other purposes, such as creep resistance, without sacrificing oxidation resistance. Considering the overall performance at 100 and 300 hours, the three-way addition of Ta+Pt+Oxide produced the best results.

The coatings of Table 4 were deposited on 7 mm diameter by 85 mm long bar for burner rig testing. The coatings were heat treated, finished and peened. In this test, the rig was

TABLE 5

| Coating Sample | *DENSITY gm/cm3 | | | HOT HARDNESS, Hv 0.6 Kg | | | | | | 1050° C. EXTERNAL ALUMINIDE DEPLETION | |
|---|---|---|---|---|---|---|---|---|---|---|---|
| | | | | TEMPERATURE, °C. | | | | | | | |
| | Apparent | Theoretical | % Theor | 22 | 200 | 400 | 600 | 800 | 900 | 100 Hrs | 300 Hrs |
| I | 7.27 | 7.57 | 96.1 | 604 | 441 | 277 | 21 | 61 | 33 | 0.57 | 0.59 |
| II | 7.58 | 7.99 | 94.9 | 459 | 302 | 281 | 221 | 74 | 17 | 0.44 | 0.83 |
| III | 6.58 | 7.28 | 90.4 | 467 | 371 | 291 | 216 | 77 | 39 | 0.71 | 1.07 |
| IV | 6.62 | 7.39 | 89.5 | 242 | 189 | 163 | 143 | 59 | 25 | 0.53 | 1.36 |
| V | 6.83 | 7.71 | 88.6 | 260 | 201 | 143 | 111 | 51 | 25 | 0.61 | 1.12 |
| VI | 6.88 | 7.82 | 87.9 | 326 | 243 | 118 | 61 | 31 | 24 | 0.42 | 0.80 |
| VII | 6.65 | 7.45 | 89.2 | 511 | 359 | 294 | 219 | 52 | 23 | 0.76 | 3.36 |
| VIII | 6.96 | 7.80 | 89.3 | 537 | 413 | 374 | 306 | 114 | 51 | 0.29 | 0.93 |

*average density after 4 hour 1080° C. vac. heat treatment

Figure 6:
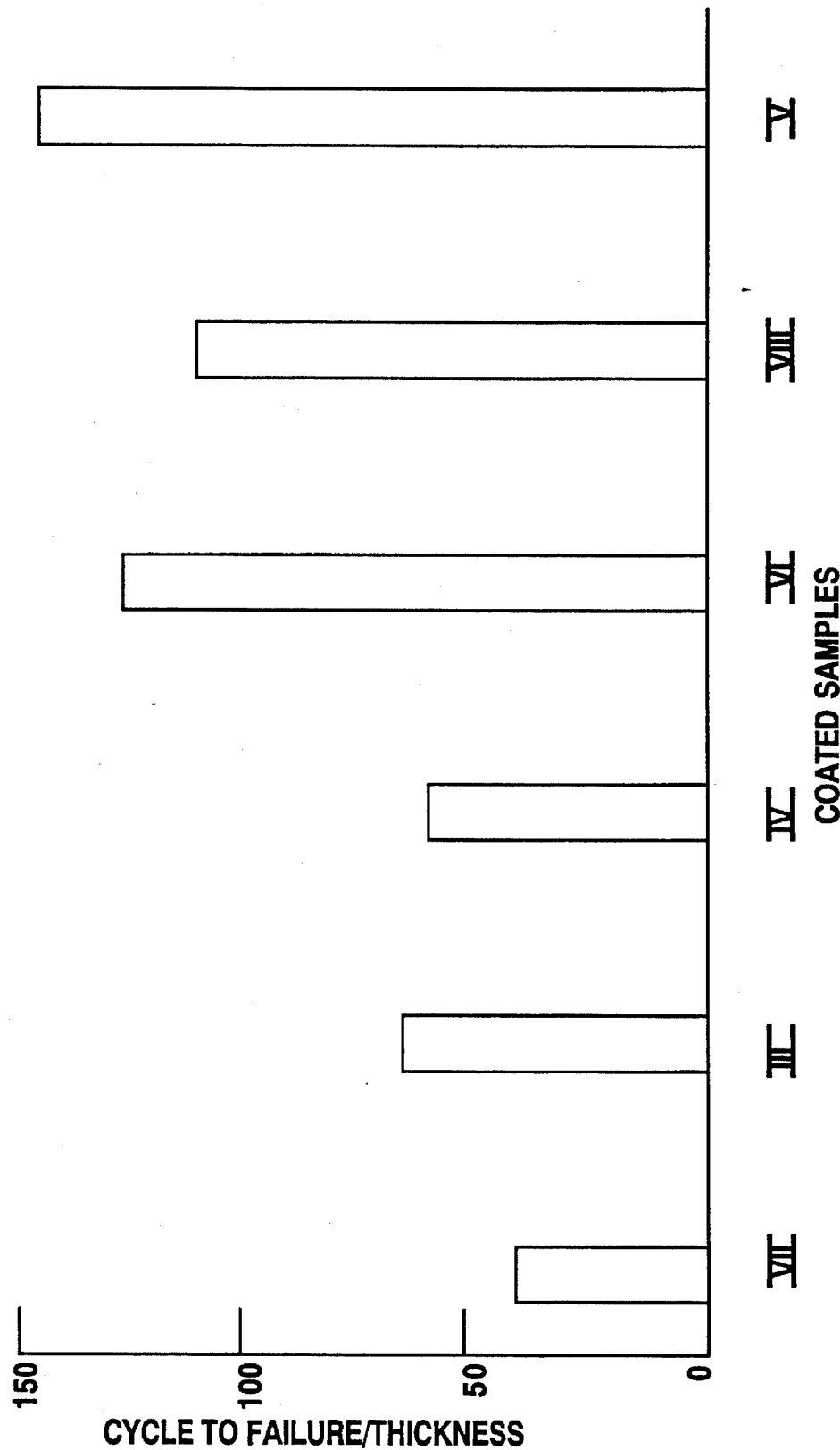
FIG. 6. Graph of burner rig cycles to penetrate various coatings.

The hot hardness of the coatings was measured for temperatures up to 900° C. using a Vickers type indentor under a load of 0.6 Kg. The results are shown in Table 5. It was found that the coatings with the oxide and platinum and/or tantalum additive were generally softer than the Sample I coating and this effect is believed to be strongly related to the lower coating densities. Even so, the three-way addition coating Sample VIII was found to have significantly higher hardness at high temperature than Sample I. It was found that Sample VII had about the same hot hardness as Sample I and that Sample II was softer than Sample I even though the densities of Sample I and Sample II were reasonably close. The Ta plus Pt addition softened the coating, while the Oxide addition made little change, and yet, Ta+Pt+Oxide had a substantial hardening effect. Thus an unexpected interaction occurred in the three-way addition that gave a significantly improved hot hardness result.

operated as in Example 1, except the temperature was increased to 1100° C. The results for cycles to failure are shown in FIG. 6. The Sample I coating was not in this test, but from Example 1 we see that the oxide-only addition coatings are better than the Sample I coatings. The data indicate that the oxide+platinum and the oxide+tantalum+platinum multiple additions to be significantly better. They had about two to three times greater life in the burner rig test than the oxide-only additions, which would make them significantly better than the no-addition simple Sample I coating.

Figure 7:
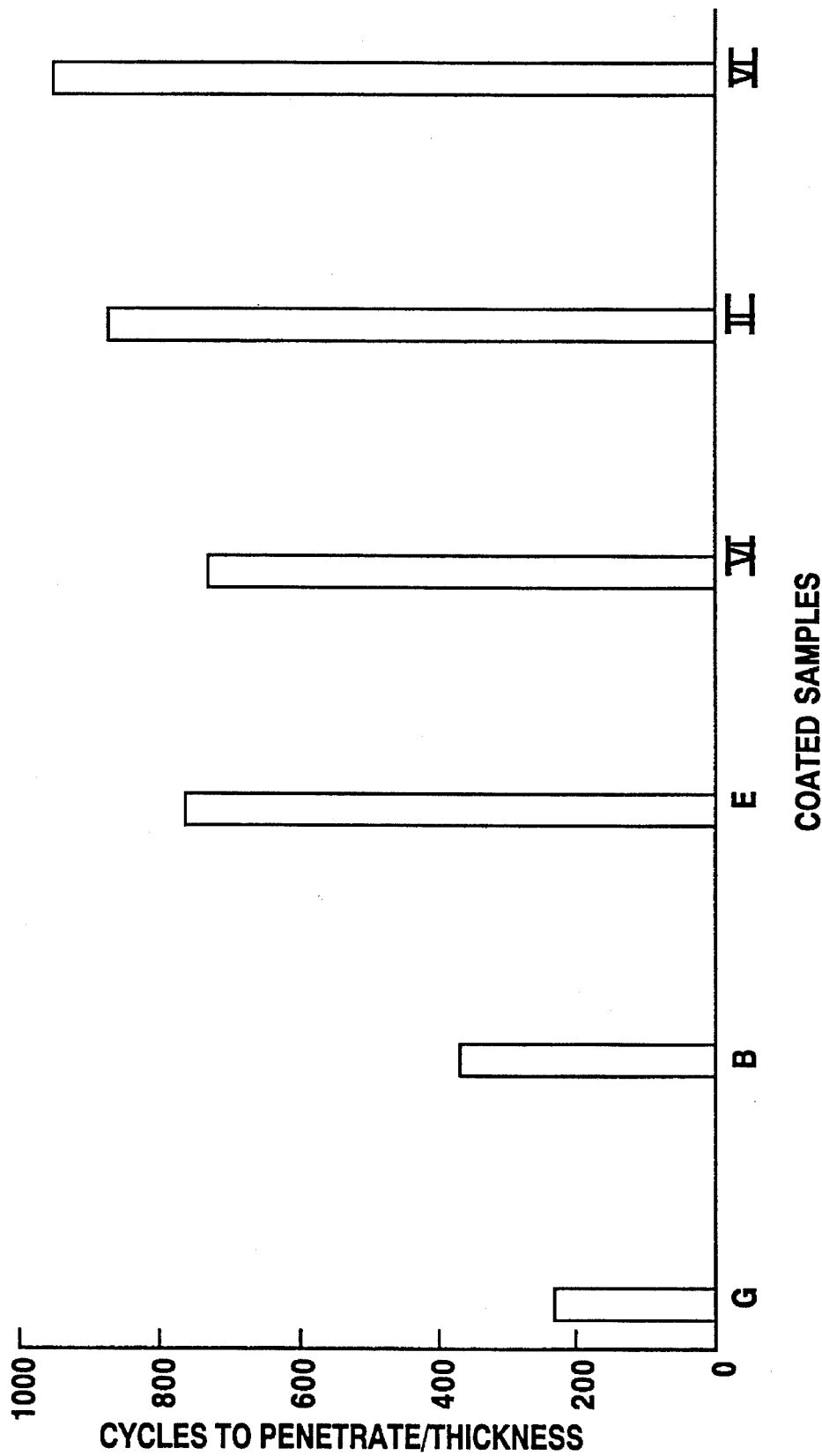
FIG. 7. Graph of burner rig cycles to penetrate various coatings.

Some of the compositions of Tables 3 and 4 were deposited on bars and subjected to a burner rig test. In this case the substrate was single crystal CMSX-4, an advanced nickel base alloy for high performance turbine blades. The burner rig test was as described above, except the injected salt concentration was reduced to 0.25 ppm. The test was at 1100° C., with 13 minutes in the burner and 1 minute out of flame cooling, as before. It took about 1 minute to come back to 1100° C. when cycled back into the burner. The results are presented in FIG. 7, as the cycles to failure divided by the coating thickness in mils. This essentially normalizes out any life difference due to different coating thickness. The coatings were still made to nominally 6 mils thickness. It was found that all coatings containing platinum had about twice the life as coatings with only tantalum or oxide single additions. Furthermore, tantalum plus platinum was slightly better than platinum alone, and tantalum plus platinum plus oxide was the best of all.

Figure 8:
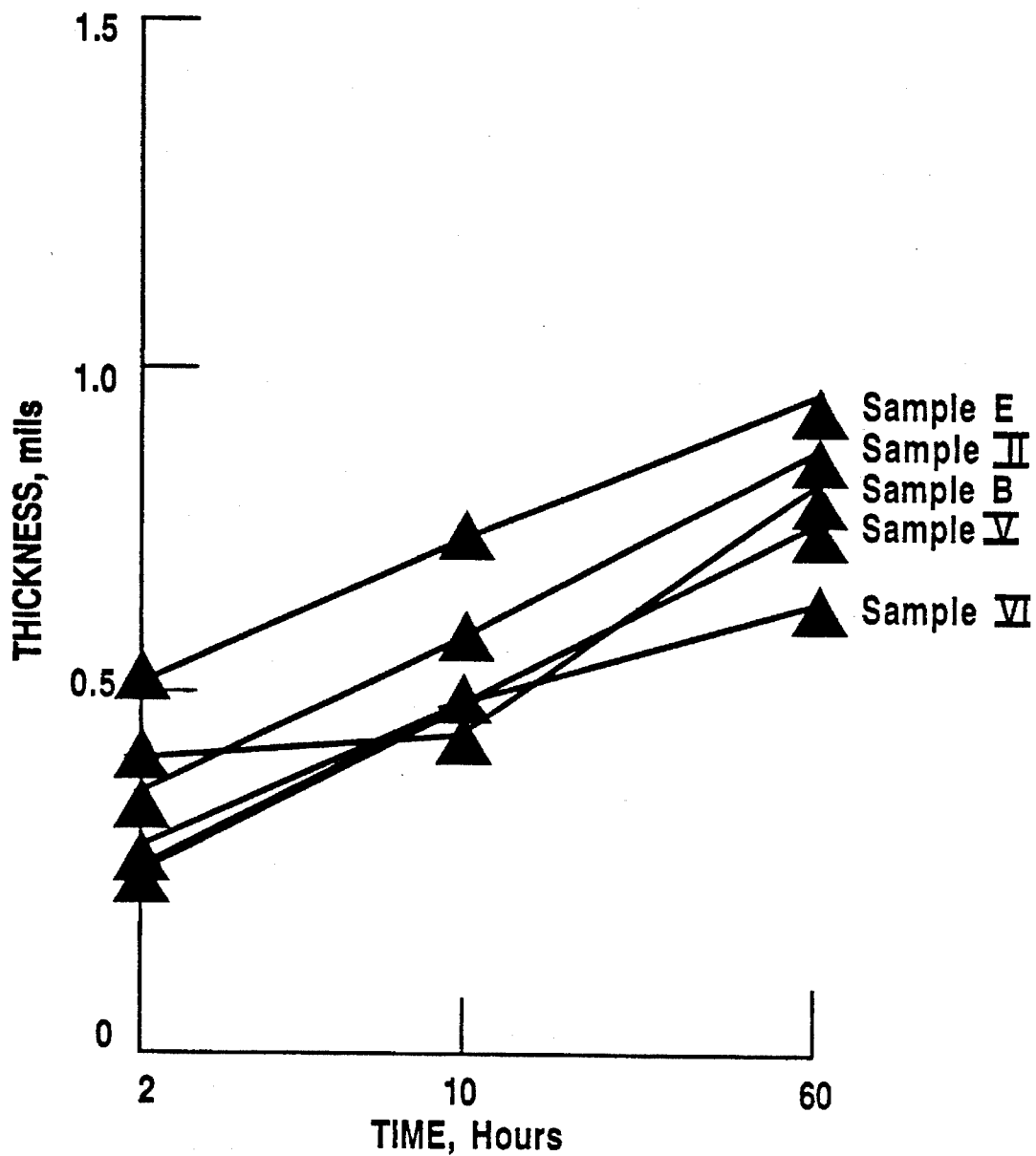
FIG. 8. Graph of diffusion zone penetration into CMSX-4 substrate vs. time for several overlay samples coatings.

To assess the ability of the new coating formulations to resist diffusion into the substrate, we ran long exposure isothermal tests at 1100° C. in argon, then measured the interdiffusion zone width in cross section. We used the same Sample I coating to which we added the additives. FIG. 8 shows the results up to 60 hours. We found that the coatings with the greater diffusion zone widths contained platinum. The presence of tantalum alone or the combination of tantalum and platinum additions reduced interdiffusion. The further addition of oxide to a platinum bearing coating also reduced interdiffusion. The best coating for reducing interdiffusion from our studies was the three-way addition of platinum plus tantalum plus oxide. The overall observation is that the tantalum and oxide additions are the most effective components for reducing interdiffusion.

The data show that tantalum, particularly in combination with oxide are effective additions for our purpose of reducing interdiffusion with the substrate. We want to limit the loss of Al and Cr from the coating to diffusion into the substrate, but we also want to keep deleterious elements from entering the coating and reducing its protective nature. To help understand the particular effect of tantalum, we had coatings with and without the tantalum addition analyzed by the electron microprobe after an oxidation exposure of up to 400 hours at 1050° C. The substrates were In-100 and Mar M-002. It was discovered that the tantalum in the coating was reacting with titanium which was trying to diffuse from the substrate into the coating. Ta-Ti particles would form, at first in the coating near the substrate, and later higher up in the coating as time progressed and the tantalum was consumed in this reaction. Thus one role of Ta in improving the oxidation resistance was thus the trapping of Ti and reducing its migration to the outer oxide scale on the coating, where it had been adversely affecting the protective scale. This finding makes the value of tantalum additions to coatings particularly useful on titanium bearing superalloy substrates such as IN 100, Mar-M-002, Rene' 80, and on variants of Mar-M 200 and B-1900.

The coatings containing particularly the oxide additions were found to have reduced densification in a typical heat treatment (2 to 4 hours at 1080° C. to 1100° C.). The lower density obtained in Coating Samples III through VIII as shown in Table 5 are expected to reduce all mechanical properties compared to what they would be at a higher density, and reduce the oxidation and corrosion resistance somewhat. The thermal expansion and Poisson's ratio values would not be expected to be affected. While the properties are still good at the normal heat treated density, further improvements are expected at the higher density. Freestanding pieces of the Sample VI coating (CoNiCrAlY plus Pt, Ta and Oxide) were made and subjected to heat treatments at higher temperatures. The results showed that the improvement in density is obtainable if the newly developed coating is combined with a heat treatment that is optimized to the coating. It is expected that the higher density obtained will enhance other coating properties, such as increasing oxidation and sulfidation resistance, increasing strain to failure, increasing yield strength and ultimate tensile strength, and increase the coatings' resistance to creep. The thermal expansion coefficient would not be expected to change.

The improved coatings of this invention are also useful as bondcoats or undercoats in a thermal barrier coating system. In a thermal barrier, typically there is a three to ten mil thick bondcoat of a Sample I coating (Table 4), then a ten to twelve mil or more thick layer of yttria-stabilized zirconia coating. A blade was coated with a bondcoat using the Sample VI coating, followed by a 10 ml thick layer of yttria-stabilized zirconia. The same plasma torch was used for both layers, with just the powders and the operating conditions changed. The thermal barrier coated blade was heat treated 2 hours at 1100° C. in vacuum, and the zirconia external surface smoothed in the vibratory finisher using abrasive alumina media. The microstructure of the thermal barrier coated blade showed a well bonded undercoat and oxide layer which is needed for successful barrier coating.

It is to be understood that modifications and changes to the preferred embodiment of the invention herein shown and described can be made without departing from the spirit and scope of the invention. For example, a post-coating of aluminum or chromium by the pack cementation process over the coating of this invention could result in at least a portion of the aluminum or chromium diffusing into the coating. Another example is to have a coating of this invention coated with a top layer of zirconia to produce a good duplex thermal barrier coating.

What is claimed:

1. A coating composition consisting essentially of an alloy of RCrAlR'R" wherein R is at least one element selected from the group consisting of iron, cobalt and nickel, R' is yttrium and R" is a combination of tantalum and platinum, and wherein said alloy contains an oxide dispersion and wherein R is between 19 and 83 weight percent of the alloy; Cr is between 10 and 50 weight percent of the alloy; Al is between 4 and 14 weight percent of the alloy; R' is between 0.1 and 3 weight percent of the alloy; and R" is between 3 and 14 weight percent of the alloy.

2. The coating composition of claim 1 wherein the oxide dispersion is selected from the group consisting of alumina, thoria, yttria and rare earth oxides, hafnia and zirconia.

3. The coating composition of claim 1 wherein the oxide dispersion is between 5 and 20 volume percent of the coating composition.

4. The coating composition of claim 3 deposited as a layer on a cobalt base superalloy substrate and wherein R is more than 50% by weight cobalt based on the total weight of the coating composition.

5. The coating composition of claim 1 wherein the alloy is selected from the group consisting of NiCrAlYPtTa; NiCoCrAlYPtTa; and CoCrAlYPtTa.

6. The coating composition of claim 5 wherein the alloy is NiCoCrAlYPtTa and the oxide dispersion is alumina.

7. The coating composition of claim 1 deposited as a layer on a substrate selected from the group consisting of nickel base superalloys and cobalt base superalloys.

8. The coating composition of claim 1 deposited as a layer on a nickel base superalloy substrate and wherein R is more than 50% by weight nickel based on the total weight of the coating composition.

9. The coating composition of claim 1 deposited on a substrate selected from the group consisting of blades and vanes for a gas turbine engine.

10. The coating composition of claim 9 deposited on a substrate and having a top layer of aluminum, chromium or mixture thereof deposited on said coating composition layer in which at least a portion of said aluminum or chromium of said top layer is diffused into said coating composition layer.

11. The coating composition of claim 1 deposited as a layer on a substrate and having a top layer of a zirconium oxide deposited on said coating composition layer thereby forming a duplex layer on said substrate.

* * * * *